(12) United States Patent
Stroud et al.

(10) Patent No.: US 12,722,132 B2
(45) Date of Patent: Sep. 1, 2026

(54) MOLECULARLY DOPED NANODIAMOND

(71) Applicant: The Government of the United States of America, as represented by the Secretary of the Navy, Arlington, VA (US)

(72) Inventors: Rhonda M. Stroud, Washington, DC (US); Matthew J. Crane, Seattle, WA (US); Peter J. Pauzauskie, Seattle, WA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 1293 days.

(21) Appl. No.: 17/512,929

(22) Filed: Oct. 28, 2021

(65) Prior Publication Data

US 2022/0048002 A1 Feb. 17, 2022

Related U.S. Application Data

(62) Division of application No. 16/297,338, filed on Mar. 8, 2019, now Pat. No. 11,325,086.

(60) Provisional application No. 62/645,098, filed on Mar. 19, 2018.

(51) Int. Cl.

| | |
|---|---|
| ***B01J 3/06*** | (2006.01) |
| ***B01J 13/00*** | (2006.01) |
| ***C01B 32/26*** | (2017.01) |

(52) U.S. Cl.
CPC .......... *B01J 3/062* (2013.01); *B01J 13/0091* (2013.01); *C01B 32/26* (2017.08); *B01J 2203/062* (2013.01); *B01J 2203/0625* (2013.01); *B01J 2203/0655* (2013.01); *C01P 2002/52* (2013.01); *C01P 2002/82* (2013.01); *C01P 2002/84* (2013.01); *C01P 2004/03* (2013.01)

(58) Field of Classification Search
None
See application file for complete search history.

(56) References Cited

U.S. PATENT DOCUMENTS

2011/0129614 A1* 6/2011 Pauzauskie ......... C01B 33/1585 252/500

* cited by examiner

*Primary Examiner* — Guinever S Gregorio
(74) *Attorney, Agent, or Firm* — US Naval Research Laboratory; Stephen T. Hunnius

(57) ABSTRACT

A method of making molecularly doped nanodiamond. A versatile method for doping diamond by adding dopants into a carbon precursor and producing diamond at high pressure, high temperature conditions. Molecularly doped nanodiamonds that have direct incorporation of dopants and therefore without the need for ion implantation. Molecularly-doped diamonds that have fewer lattice defects than those made with ion implantation.

13 Claims, 7 Drawing Sheets

MOLECULARLY DOPED NANODIAMOND

REFERENCE TO RELATED APPLICATION

This application is a non-provisional of, and claims priority to and the benefits of, U.S. patent application Ser. No. 16/297,338 filed on Mar. 8, 2019, and U.S. Patent Application No. 62/645,098 filed on Mar. 19, 2018, the entirety of each is hereby incorporated by reference.

BACKGROUND

This disclosure concerns a versatile method for doping diamond by adding dopants into a carbon precursor and producing diamond at high pressure, high temperature conditions.

The characterization and manipulation of dopants in diamond has generated a wide range of applications spanning quantum computing, sensing, and cryptography, the determination of interstellar origin in meteoritic samples, and biolabeling, due to the remarkable properties of the diamond host.

The dense diamond lattice exhibits a negligible immune response, maintains a wide bandgap, and, notably, restricts heteroatom defect diffusion at temperatures far above the diamond-graphite phase line at atmospheric pressure. For example, a common defect in diamond, substitutional nitrogen, does not diffuse at temperatures below 2000° C.

In quantum sensing applications, this low diffusion coefficient enables the reliable use of single-defects like the nitrogen vacancy center ($NV^-$) to optically measure local spatiotemporal variations, which modify the defect's spin precession rate, without fear of color center migration over long time scales.

Similar applications in quantum cryptography have been proposed for the negatively-charged, silicon-divacancy ($SiV^-$) center. Because diffusion doping is not practical in diamond at ambient pressure, ion implantation is typically used to incorporate heteroatomic defects. This process relies on Poisson statistics, SRIM calculations, and masking techniques to control color center generation in chemical vapor deposition (CVD) diamond substrates.

However, ion implantation also creates significant lattice damage, fragmentation of ions, and cannot deterministically produce polyatomic defects.

Due to these challenges, progress in single-defect applications often occurs by bulk defect production with implantation followed by confocal-scanning searches for ideal color centers.

The current state-of-the-art method for incorporation of dopants into nanodiamond requires ion implantation. However, during implantation, accelerated ions dissociate as they pass through a pre-grown diamond lattice, limiting the composition and location of the resulting color centers achievable with this top-down process, and introducing unwanted radiation-induced defects into the diamond lattice.

In contrast, our synthesis of a doped amorphous carbon precursor and transformation at high pressure, high temperature (HPHT) conditions, we are able to flexibly incorporate dopants across much of the periodic table, including nominally non-reactive species such as noble gases.

Our alternative method for doped, diamond synthesis is high pressure, high temperature (HPHT) equilibrium phase conversion. While HPHT processes have produced doped diamonds, the rational formation of heteroatomic defects has remained elusive.

In addition, HPHT experiments, including diamond syntheses, conventionally employ noble gas pressure media, which, if incorporated into the lattice, have been proposed as defects for quantum sensing.

However, to date, noble gas defect formation, such as xenon-related dopants, has been restricted to ion implantation. Despite its nearly-ubiquitous role in high pressure experiments, noble gas pressure media is widely considered to be inert, and there are no studies regarding the conditions that lead to incorporation within the diamond lattice at HPHT conditions.

To overcome diamond's low diffusion coefficient and to study the incorporation of noble gas dopants without ion implantation, we created a bottom-up methodology to dope diamond by first synthesizing a doped amorphous carbon precursor and then converting it to diamond at HPHT conditions in a noble gas environment. This allows us to integrate the desired dopant into carbon while it is thermodynamically stable with traditional synthetic chemistry techniques, rather than rely on ion implantation into a metastable diamond substrate and investigate noble gas incorporation at HPHT.

SUMMARY OF DISCLOSURE

Description

This disclosure concerns a versatile method for doping diamond by adding dopants into a carbon precursor and producing diamond at high pressure, high temperature conditions.

Molecularly doped diamond is a new state of matter in which dopants in the form of atoms and molecules are directly incorporated into diamond nanoparticles during high pressure, high temperature synthesis, in order to tune the optical and other functional properties.

The development of color centers in diamond as the basis for emerging quantum technologies has been limited by the need for ion implantation to create the appropriate defects. We present a versatile method to dope diamond without ion implantation, by synthesis of a doped amorphous carbon precursor and transformation at high temperatures and high pressures.

To explore this bottom-up method for color center generation, we rationally create silicon-vacancy defects in nanodiamond and investigate them for optical pressure metrology. In addition, we show that this process can generate noble gas defects within diamond from the typically-inactive argon pressure medium, which explains the hysteresis effects observed in other high pressure experiments and the presence of noble gases in some meteoritic nanodiamonds. Our results illustrate a general method to produce color centers in diamond, and enable the controlled generation of designer defects.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

Figure 1:
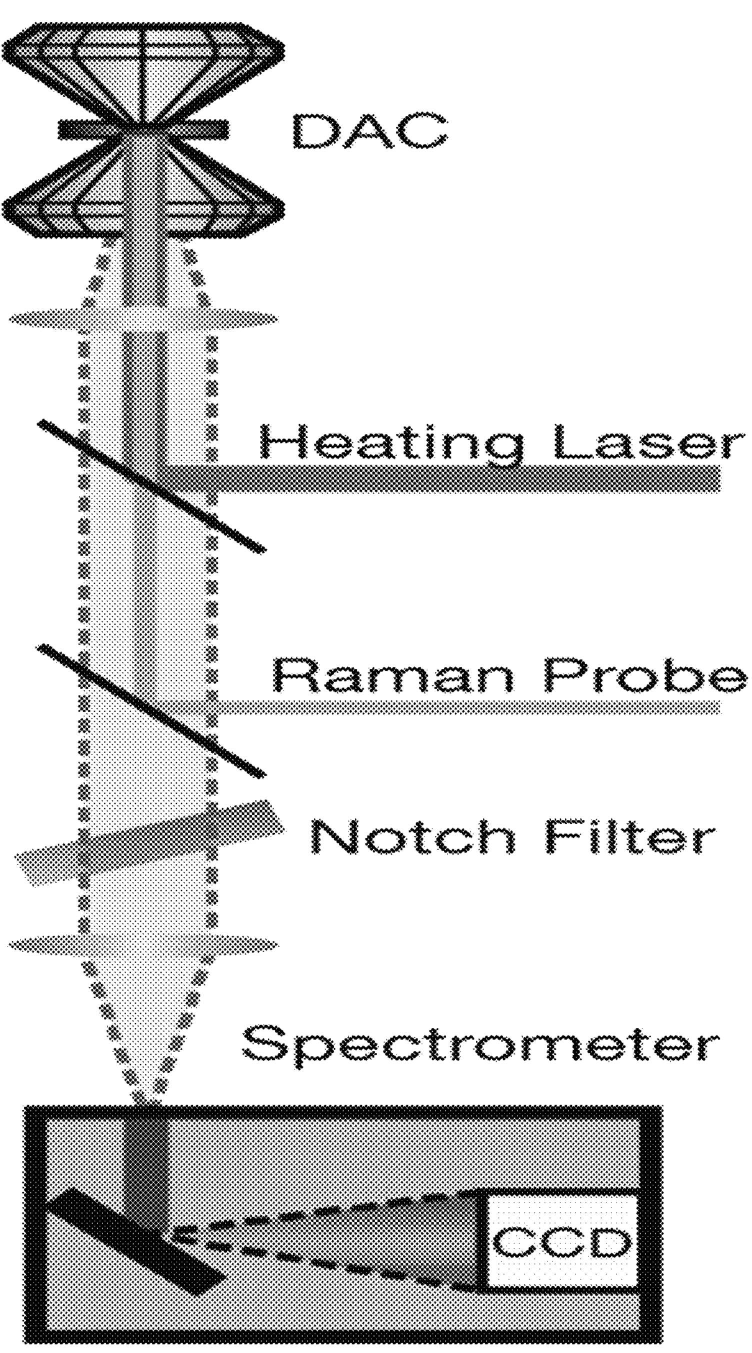
FIG. 1 illustrates a laser-heated diamond anvil cell (DAC) to achieve the necessary pressure and temperature. The carbon aerogel is loaded into the DAC, and placed in a sealed chamber with flowing Ar or other gas, to remove surface adsorbed species. Liquefaction of the flowing gas is achieved by condensing the gas with liquid nitrogen, or cryogen. Thus the pores of the amorphous aerogel are filled with liquid Ar or other liquefied gas. The DAC containing the noble-gas-infiltrated aerogel precursor is then sealed and pressurized to conditions that thermodynamically favor diamond, >20 Gpa, and the sample is heated to >2000K with a near-infrared CW laser. The conversion to diamond is confirmed with in situ Raman spectroscopy.
Figure 2:
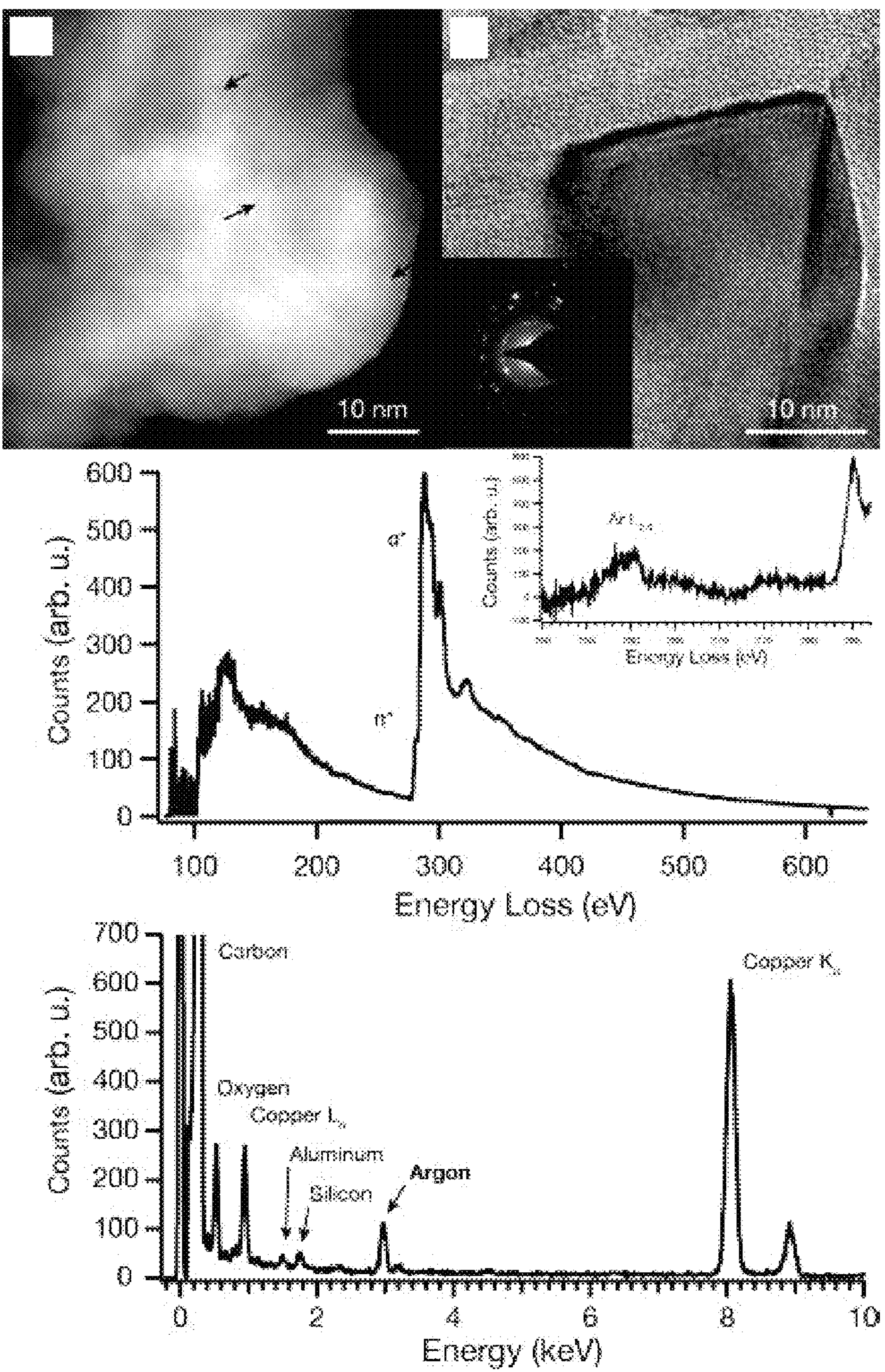
FIG. 2 illustrates a structural and chemical characterization after HPHT synthesis. STEM-HAADF and BF-TEM illustrate the microstructure of the recovered diamond material. Arrows in the STEM-HAADF image point out example impurity atoms (mostly Ar and Si), and the inset in the panel contains SAED, corresponding to diamond. In addition, it exhibits 2.08 Å lattice spacings. The Figure details the d-spacing assignments. STEM-EELS and STEM-EDS of the region displayed showing the silicon L-edge and carbon K-edge, and elemental composition, respectively. The small concentration of aluminum comes from trace amounts of ruby during laser heating. The Cu peak is from the sample grid and STEM pole piece. The inset in the panel displays the carbon pre-edge features and the argon $L_{2,3}$ peak.
Figure 3:
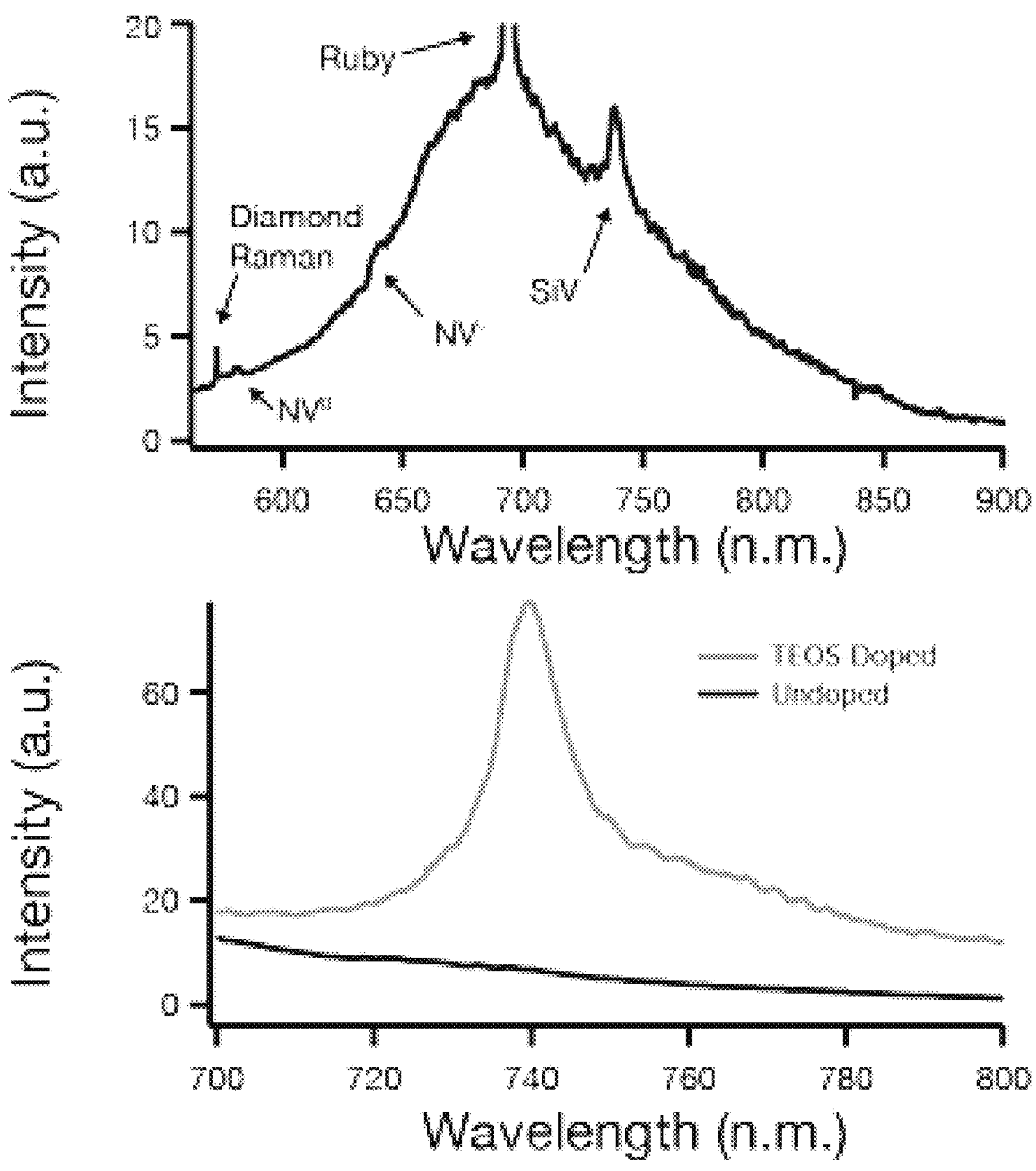
FIG. 3 illustrates photoluminescence of a color center. Photoluminescence and Raman scattering of recovered nanodiamond synthesized from the TEOS-doped carbon aerogel after depressurization and removal from the DAC. Labels denote diamond Raman scattering, and $NV^0$, $NV^-$, and $SiV^-$ color center ZPLs. Shown are high resolution spectra of the $SiV^-$ region comparing TEOS-doped and undoped carbon aerogels.
Figure 4:
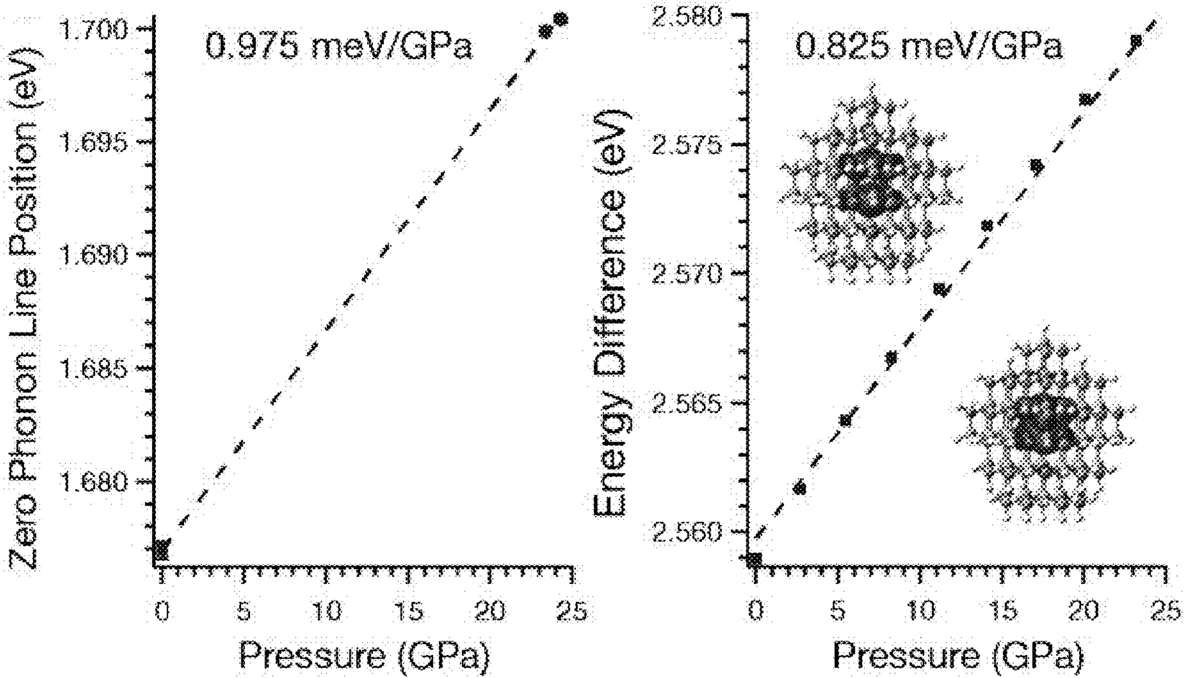
FIG. 4 illustrates evaluation of $SiV^-$ center for optical pressure manometry. Shown are experimental $SiV^-$ ZPLs and the B3LYP/6-31G(d) average energy differences of the molecular orbitals which exhibit largest contributions to the absorption peak responsible for the ZPL at different pressures. Error bars for both pressure and ZPL energy sit within the circular markers. The insets illustrate the contour plots (0.025 isodensity) of the LUMO and the HOMO-2 molecular orbitals (the largest contribution) of a $SiV^-$ containing nanodiamond ($C_{119}SiH_{104}$), oriented perpendicular to the diamond <1,1,1> axis, as modeled with DFT. The atoms are hydrogen, carbon, and silicon, respectively.
Figure 5:
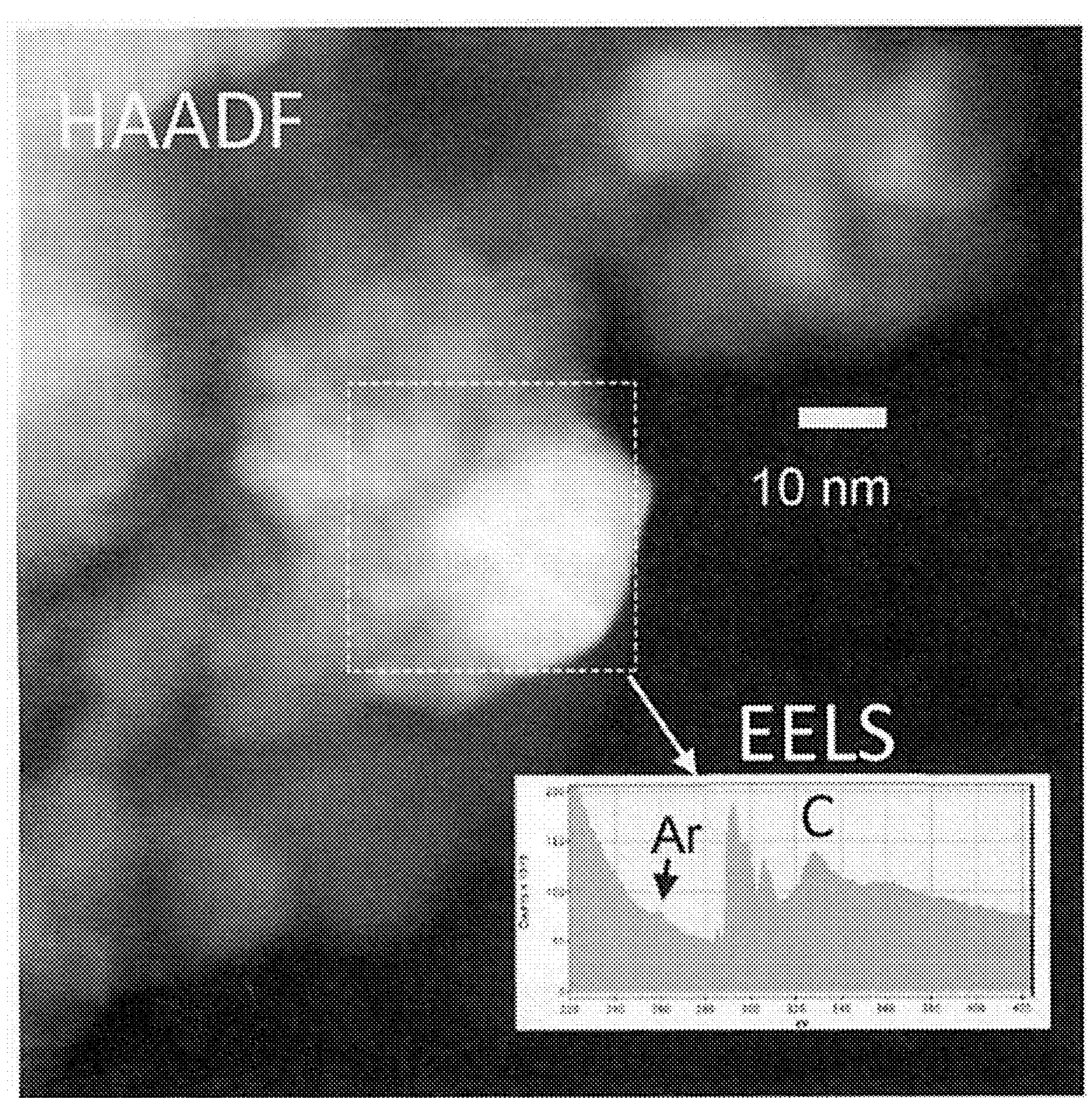
FIG. 5 illustrates a scanning transmission electron microscope annular dark field image and electron energy loss spectrum demonstrating the incorporation of Ar into nanodiamond.
Figure 6:
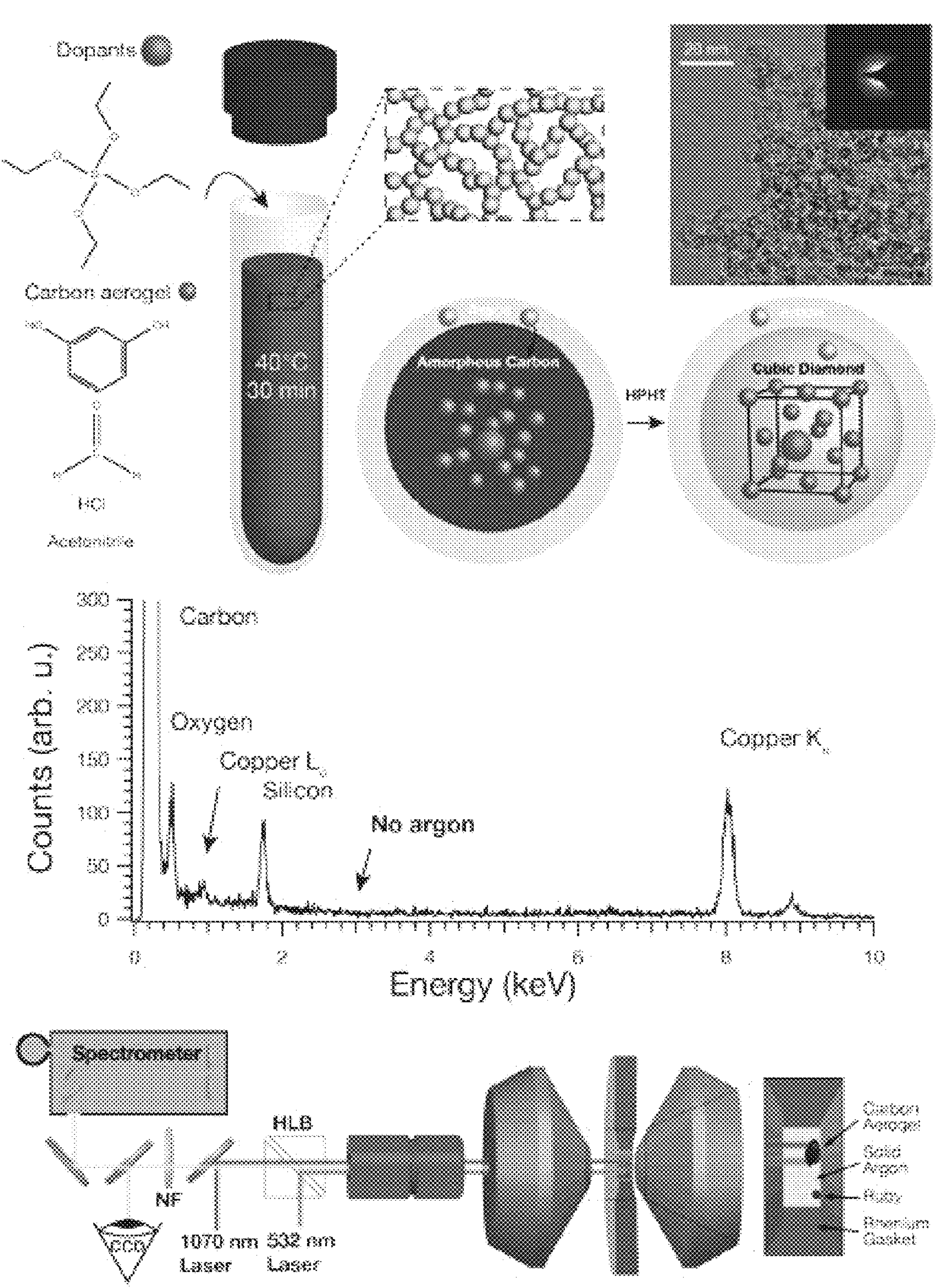
FIG. 6 illustrates a carbon precursor doping mechanism and characterization A schematic is shown representing the synthesis and doping of carbon aerogels, including a BF-TEM image with SAED inset. Dopants are introduced alongside resorcinol and formaldehyde incorporate within the carbon aerogel grains. Upon conversion to diamond at high pressure and high temperature, dopants remain inside the diamond lattice as color centers. An EDS spectra is shown of the carbon aerogel as synthesized showing only the presence of carbon, silicon, and oxygen. The copper signal comes from the TEM grid. A schematic shows a 1070 nm heating laser or polarized 532 nm Raman and photoluminescence laser focused into the pressurized diamond anvil cell, which is loaded with a carbon aerogel precursor, ruby for pressure measurements, and a solid argon pressure media, contained by a rhenium gasket.
Figure 7:
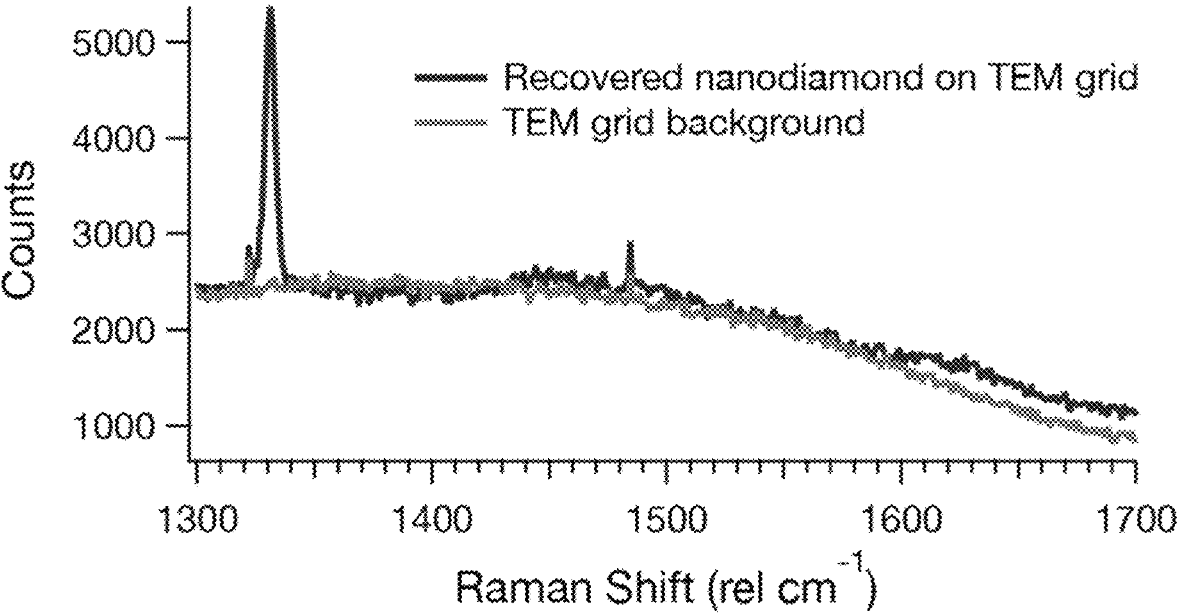
FIG. 7 illustrates photoluminescence of color center. High resolution photoluminescence spectra of the $SiV^-$ region comparing TEOS-doped and undoped carbon aerogels. Photoluminescence and Raman scattering of recovered nanodiamond synthesized from the TEOS-doped carbon aerogel after depressurization and removal from the DAC. Labels denote diamond Raman scattering, and $NV^0$, $NV^-$, and $SiV^-$ color center ZPLs. Ruby is used as the in situ pressure sensor.

This invention concerns a versatile method for doping diamond by adding dopants into a carbon precursor and producing diamond at high pressure, high temperature conditions.

Example 1

The molecularly doped diamonds are synthesized in two stages. In the first step, a nanoporous carbon aerogel is produced. Carbon aerogels are synthesized from adding resorcinol, formaldehyde (37 wt-% methanol-stabilized aqueous solution), and hydrochloric acid (37 wt-%) to acetonitrile to achieve a molar ratio of resorcinol to formaldehyde, hydrochloric acid, and acetonitrile of 1:2, 8.4:1, and 1:76.

Molecular dopants that can be dispersed into the organic precursors, e.g., Si, are then added to the sol-gel. For silicon-doped carbon aerogel, we added tetraethyl orthosilicate (98 wt-%) at a final molar ratio of $4.5\times10^{-9}$ M. The solution is ultrasonicated until the gel solidifies, typically 30 minutes.

Next the acetonitrile solvent is exchanged with ethanol 4 times over 5 days. The gel is dried with supercritical CO2 in an autoclave to prevent pore collapse due to capillary pressure. The gels are then pyrolyzed at 1000° C. in an inert atmosphere for 4 hours to remove oxygen moieties, and sinter the aerogel structure to prevent pore collapse during subsequent processing.

Example 2

In the second step, the amorphous carbon aerogel is converted under high temperature and pressure (HPHT) into nanodiamond aerogel.

To achieve HPHT conditions, we employed a laser-heated diamond anvil cell (DAC). First, we dimpled a rhenium gasket and drilled a hole in the center of the gasket to form the walls of the high-pressure chamber. We then returned the gasket to the DAC and transferred the carbon aerogel and finely-ground ruby crystals into the DAC's cavity.

The carbon aerogel and ruby act as a diamond precursor and a pressure monitor, respectively. To remove adsorbed species from the aerogel, we placed the DAC into a sealed chamber and flowed argon gas over the aerogel for at least 30 minutes.

Afterward, we used liquid nitrogen to condense the flowing argon and subsequently tightened the DAC to trap liquid argon in the DAC's chamber. By condensing liquid argon from a gaseous argon environment, we infiltrate the carbon aerogel precursor's pores with gaseous and then liquid argon to maintain the aerogel pore structure.

Other noble gases (Kr, Xe, Ne) can be substituted for Ar, at the appropriate liquefaction temperature.

Finally, the DCA loaded with the noble-gas infiltrated aerogel precursor pressurized is pressured to above 20 GPa to thermodynamically favor diamond formation and heated to above 2000 K with a near-infrared, continuous laser.

The conversion of the aerogel to diamond is confirmed with in situ Raman spectroscopy.

There are several advantages to our method.

One advantage of our molecularly doped nanodiamonds is that the direct incorporation of dopants without the need for ion implantation broadens the range of possible molecular dopants to those that can be dispersed in the aerogel precursor.

Dopants that are not stable at the voltages required for ion implantation into diamond, as well as noble gases or other volatiles can be incorporated.

In addition, the HPHT molecularly-doped diamonds have fewer lattice defects because they are not ion irradiated.

Example 3

The development of color centers in diamond as the basis for emerging quantum technologies has been limited by the need for ion implantation to create the appropriate defects.

Presented here is a solution to these long-standing problems.

Here, we present a versatile method to dope diamond without ion implantation, by synthesis of a doped amorphous carbon precursor and transformation at high temperatures and high pressures. To explore this bottom-up method for color center generation, we rationally create silicon-vacancy defects in nanodiamond and investigate them for optical pressure metrology.

In addition, we show that this process can generate noble gas defects within diamond from the typically-inactive argon pressure medium, which may explain the hysteresis effects observed in other high pressure experiments and the presence of noble gases in some meteoritic nanodiamonds.

Our results illustrate a general method to produce color centers in diamond, and may enable the controlled generation of designer defects.

Example 4

To overcome diamond's low diffusion coefficient and to study the incorporation of noble gas dopants without ion implantation, we propose a bottom-up methodology to dope diamond by first synthesizing a doped amorphous carbon precursor and then converting it to diamond at HPHT conditions in a noble gas environment.

This allows us to integrate the desired dopant into carbon while it is thermodynamically stable with traditional synthetic chemistry techniques, rather than rely on ion implantation into a metastable diamond substrate and investigate noble gas incorporation at HPHT.

Here, we synthesized a nanostructured carbon aerogel precursor with a controlled chemical composition, and subjected it to HPHT conditions in a laser-heated diamond anvil cell (DAC) with an argon pressure medium.

Bright-field transmission electron microscopy (BF-TEM) and selected area electron diffraction (SAED) demonstrate that the aerogel consists of 6.8±1.9 nm amorphous carbon grains. We tuned the chemical composition of the aerogel grains by adding tetraethyl orthosilicate (TEOS) molecules directly to the mixture as it gelled. Energy dispersive X-ray spectroscopy (EDS) confirmed that silicon dopants were incorporated throughout the carbon precursor material.

To synthesize diamond, we placed the doped carbon precursor into a diamond anvil cell and condensed solid argon within the high-pressure chamber to infiltrate the microstructure of the aerogel.

We subsequently pressurized the cell above 20 GPa to thermodynamically favor diamond formation and drove grain growth by heating above 2000 K with a near-infrared, continuous laser.

This pressure and temperature can be varied, as it is sensitive to the temperature, pressure, and time. Therefore, other conditions can be used, for example, pressures of about 16 GPa and temperatures of about 1600 K. Furthermore, another example involves pressures of about 16.3 GPa and temperatures of about 1850 K.

Example 5

To characterize the recovered material, we examined BF-TEM, SAED, and electron energy loss (EEL) spectroscopy. We found that the recovered material exhibited nanocrystalline domains with interlayer distances corresponding to cubic diamond.

The nanodiamond grain sizes ranged from 1-200 nm, indicating that significant carbon diffusion occurs during HPHT synthesis, which was likely enhanced by the high synthesis temperatures that surpass the melting point of argon at 20 GPa (1580 K).

The carbon K-edge EEL spectra of pure diamond has a characteristic near-edge structure with prominent a* peak at 290 eV a dip at 302.5 eV. The carbon K-edge spectrum of the recovered material contained both features, further indicating that the HPHT treatment formed cubic diamond, as well as a small pre-edge peak at 285 eV. This pre-edge feature corresponds to a n* excitation associated with $sp^2$ carbon.

As observed in previous HPHT and CVD experiments, this $sp^2$ carbon likely stems from nanodiamond surface reconstruction and incomplete sample heating due to the self-limiting absorption of amorphous carbon as it converts to diamond.

Low energy loss data and Raman scattering from the recovered material similarly indicate the prevalence of $sp^3$ carbon in a diamond structure with a small amount of $sp^2$ carbon.

Example 6

EDS and EEL spectroscopy allow us to measure the chemical composition of the recovered nanodiamond and confirm the presence of dopants, including nitrogen, silicon, and argon. Other dopants include any atom or molecule that can be dissolved into the sol gel precursor at about room temperature can be incorporated into the amorphous carbon precursor and any noble gas that can be liquefied can be incorporated. The Z-contrast of high-angle annular dark field scanning transmission electron microscopy (STEM-HAADF) images identify individual atoms and clusters.

Combined, these data unambiguously demonstrate that silicon dopants added to the carbon aerogel precursor remain in and/or on the nanodiamond product after heating, despite significant grain growth.

The presence of argon within the recovered material, despite decompression to atmospheric pressure, transfer to a TEM grid, and analysis at ultrahigh vacuum conditions, demonstrates robust incorporation within the diamond lattice, rather than surface adsorption.

Example 7

We observed argon in all recovered samples synthesized at a range of pressures and temperatures from 20 to 25 GPa and 1800 to 3000 K. While other reports have demonstrated the effect of noble gas pressure media on samples at elevated pressures, such as partitioning of helium in $SiO_2$, this is the first confirmation of noble gas incorporation and recovery from HPHT.

These results suggest that the aerogel structure allows argon to incorporate within its micropores during compression and that grain growth during laser heating traps these atoms within the lattice.

For optoelectronic color center applications in diamond, this represents a new methodology for the incorporation of noble gas defects, e.g. xenon, for quantum computing and sensing.

In addition, noble gas pressure media are almost exclusively used in HPHT experiments because they remain hydrostatic to high pressures and are chemically and physically inert. The incorporation of noble gas pressure media into materials at HPHT conditions challenges the view of complete inactivity, and could explain hysteresis effects in prior DAC experiments.

It can also provide an explanation for how noble gas atoms are incorporated into nanodiamonds in astrophysical environments.

Example 8

The PL spectra of all the recovered material contain optically-active color centers from NV centers. The shoulders at 575 and 637 nm and the broad feature centered at 700 nm are uniquely characteristic of $NV^0$ and $NV^-$ zero phonon lines (ZPLs) and phonon side bands, which have been observed in multiple HPHT reports due to atmospheric $N_2$ incorporation. PL signal from the argon is neither observed nor expected.

However, the silicon-doped carbon aerogel contains a peak at 739 nm, corresponding to the $SiV^-$ color center, that is not present in undoped carbon aerogel.

These observations confirm that dopants added to the carbon aerogel precursor persist within the nanodiamond lattice and provide a new mechanism for engineering dopants in diamond.

Both SiV and NV are lower energy states than their substitutional silicon and nitrogen counterparts due to lattice relaxation, as observed in Jahn-Teller distortion of the lattice.

Unlike ion implantation, which requires annealing to drive vacancy diffusion to activate incorporated heteroatoms, optically-active color centers form immediately upon HPHT conversion to diamond.

This suggests that as the diamond lattice forms around the heteroatomic silicon and nitrogen atoms, the lowest energy structure forms immediately. While silicon atoms have been doped into diamond before, the process involved ion implantation or complete chemical breakdown in a plasma which limited controllable heteroatom defect formation.

This bottom-up approach illustrates the possibility of a new doping paradigm for diamond where molecular dopants can be designed with the precise heteroatomic stoichiometry and three-dimensional stereochemistry to create a wide range of multifunctional polyatomic point defects.

As discussed above, color centers in diamond are attractive materials for optical sensing applications due to their high stability in the chemically inert diamond lattice. Due to its narrow linewidth, the $SiV^-$ center may act as a high-resolution pressure sensor. To evaluate the defect for optical pressure metrology and illustrate the efficacy of bottom-up doping, we collected pressure-dependent photoluminescence spectra, which reveals a 0.98 meV/GPa slope from 0 to 25 GPa.

We employed ab initio calculations to model the pressure-dependence of the $SiV^-$ by fully simulating a nearly-spherical $C_{119}SiH_{104}$ nanodiamond (~1.2 nm in diameter) containing a $SiV^-$ defect under the effect of the uniform hydrostatic pressure with density functional theory using the Gaussian electronic structure package.

These theoretical results predict a 0.8 meV/GPa shift from 0 to 25 GPa, in close agreement with experimental observations. Extending the simulation up to 140 GPa demonstrates the viability of optical pressure metrology with $SiV^-$ to high pressures. To date, the high quantum efficiency, narrow linewidth d-d transitions of $Cr^{3+}$ in alumina (ruby) have made it the nearly-ubiquitous choice to measure pressure at in high pressure DAC experiments. However, ruby undergoes a phase transition at 94 GPa at 1300° C., making it unsuitable for the next generation of HPHT experiments, which have recently reached the terapascal range. On the other hand, diamond is the thermodynamically-stable polytype of carbon at all temperatures and pressures above 1 GPa until melting. The lack of phase transformation suggests that $SiV^-$-doped nanodiamond may succeed at conditions where ruby fails.

The rational incorporation of silicon by doping the carbon precursor with TEOS and argon by employing an argon pressure media into nanodiamond illustrate the potential impact of this doping methodology for doped nanodiamond applications, like pressure metrology, without ion implantation. Rather than synthesizing diamond followed by heteroatom ion implantation, vacancy center annealing, and confocal searches for color centers, the HPHT conversion of doped carbon can directly form color centers.

For single-defect applications, this research opens the door to the incorporation of more complex defects into diamond with structures defined by the chemical dopant added into the carbon precursor. If diamond nucleates prior to dissociation of the dopant, defects can be added with chemical precision limited only by molecular synthesis. For extraterrestrial nanodiamonds, where dopants in diamond are used to fingerprint the presolar and interstellar environment, this demonstration unveils the DAC as a tool to study HPHT doping that could occur in astrophysical environments. Given the prevalence of noble gas pressure media, these results have broad implications for high pressure experiments, where, to date, noble gasses had been considered inert.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising”.

What we claim is:

1. A molecularly doped nanodiamond made from the steps comprising:

adding a dopant to a sol-gel precursor;

synthesizing via sol-gel synthesis an amorphous carbon aerogel comprising an open pore network;
drying the amorphous carbon aerogel;
sintering the amorphous carbon aerogel;
preserving the open pore network;
loading the amorphous carbon aerogel into a diamond anvil cell;
forming a sealed chamber around the amorphous carbon aerogel;
flowing a noble gas into the sealed chamber;
wherein the noble gas is one selected from the group consisting of Ar, Kr, Xe, and Ne;
liquefying the noble gas by condensation;
wherein the step of liquefying the noble gas by condensation comprises condensing the noble gas with liquid nitrogen or cryogen;
allowing the liquefied noble gas to fill the open pore network of the doped amorphous carbon aerogel;
generating noble gas defects within the doped amorphous carbon aerogel;
wherein a uniform distribution of noble gas defects exists throughout the nanodiamond volume and characterized by a diamond lattice substantially free of ion-bombardment-induced displacement damage;
wherein the uniform distribution of noble gas defects throughout the nanodiamond volume is characterized by an argon peak signature via Electron Energy Loss Spectroscopy (EELS);
pressurizing the diamond anvil cell;
wherein the step of pressurizing the diamond anvil cell comprises pressures ≥20 Gpa and wherein the step of heating the doped amorphous carbon aerogel comprises temperatures ≥2000K;
heating the doped amorphous carbon aerogel incorporating the noble gas dopants; and
transforming the doped amorphous carbon aerogel incorporating the noble gas dopants into molecularly doped nanodiamond incorporating the noble gas dopants.

2. The molecularly doped nanodiamond of claim 1,
wherein the noble gas atoms are substitutional or interstitial within the diamond crystal lattice.

3. The molecularly doped nanodiamond of claim 2, wherein the diamond lattice exhibits crystalline-spacing lattice dimensions of 2.08 Å verified via Selected Area Electron Diffraction (SAED).

4. The molecularly doped nanodiamond of claim 3, further comprising co-doped silicon-vacancy color centers that natively exhibit an optical photoluminescence Zero-Phonon Line (ZPL) peak at 739 nm without post-synthesis radiation annealing.

5. The molecularly doped nanodiamond of claim 1, wherein the recovered product comprises nanocrystalline diamond domains having a grain size ranging strictly from 1 nm to 200 nm.

6. The molecularly doped nanodiamond of claim 5 wherein the diamond lattice exhibits a carbon K-edge EEL spectrum containing a prominent resonance peak at 290 eV and a spectral baseline dip at 302.5 eV.

7. The molecularly doped nanodiamond of claim 6, wherein the nanodiamond comprises an optical pressure sensor characterized by a linear photoluminescence wavelength shift slope of 0.98 meV/GPa under hydrostatic pressures from 0 to 25 GPa.

8. A molecularly doped nanodiamond composition, comprising:
a diamond crystal lattice characterized by being substantially free of ion-bombardment-induced displacement damage; and
a uniform distribution of noble gas defect atoms residing substitutionally or interstitially within said diamond crystal lattice throughout the nanodiamond volume;
wherein the uniform distribution of noble gas defects is characterized by an argon peak signature via Electron Energy Loss Spectroscopy (EELS), and
wherein the diamond lattice exhibits crystalline-spacing lattice dimensions of 2.08 Å verified via Selected Area Electron Diffraction (SAED).

9. The molecularly doped nanodiamond composition of claim 8, further comprising:
nanocrystalline diamond domains having a grain size ranging strictly from 1 nm to 200 nm.

10. The molecularly doped nanodiamond composition of claim 9, further comprising co-doped silicon-vacancy color centers that natively exhibit an optical photoluminescence Zero-Phonon Line (ZPL) peak at 739 nm without post-synthesis radiation annealing.

11. The molecularly doped nanodiamond of claim 10,
wherein the noble gas atoms are substitutional or interstitial within the diamond crystal lattice.

12. The molecularly doped nanodiamond of claim 11, wherein the diamond lattice exhibits a carbon K-edge EEL spectrum containing a prominent resonance peak at 290 eV and a spectral baseline dip at 302.5 eV.

13. The molecularly doped nanodiamond of claim 12, wherein the nanodiamond comprises an optical pressure sensor characterized by a linear photoluminescence wavelength shift slope of 0.98 meV/GPa under hydrostatic pressures from 0 to 25 GPa.

* * * * *